Patented Oct. 22, 1940

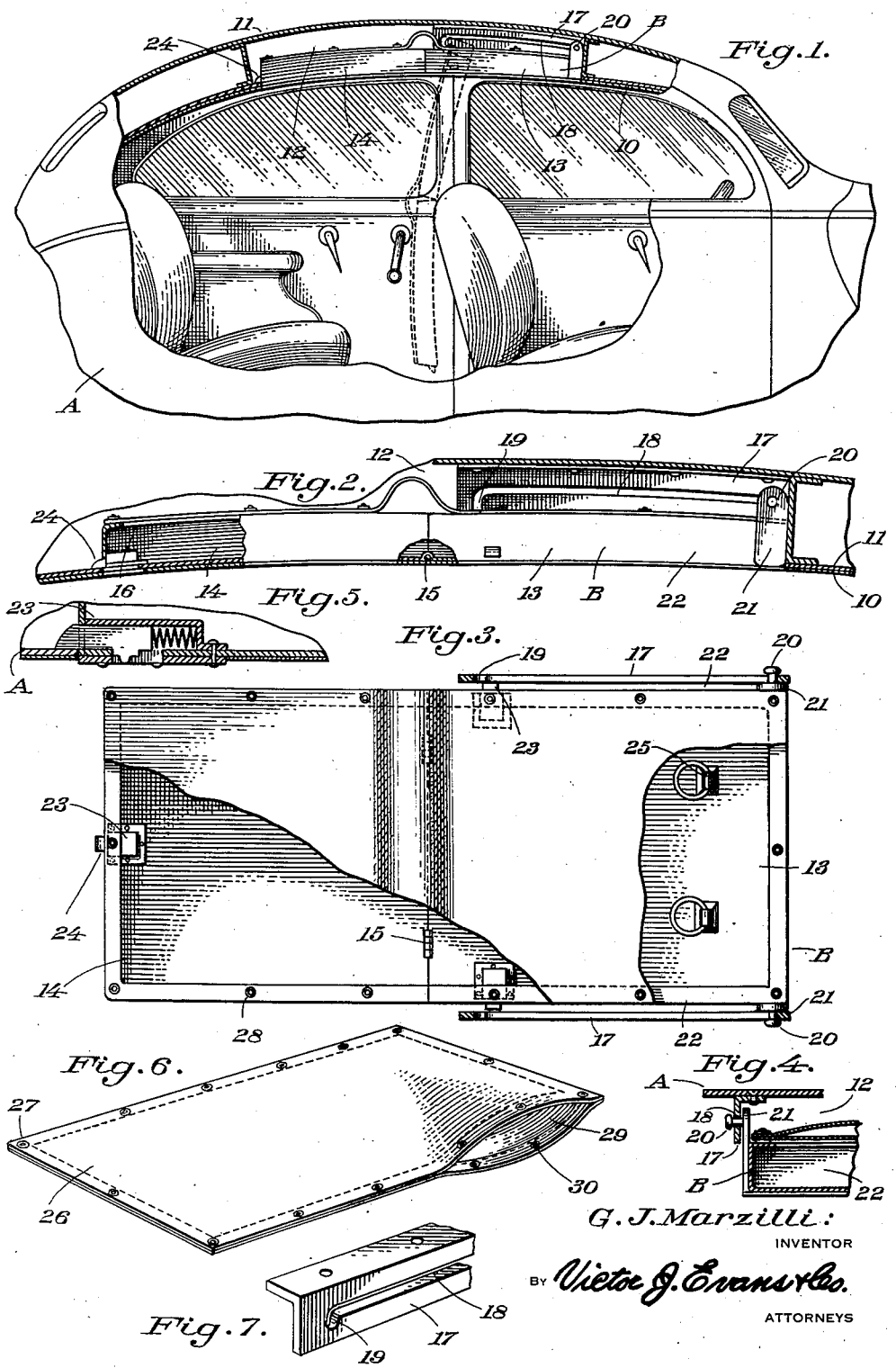

2,219,076

UNITED STATES PATENT OFFICE 2,219,076

AUTOMOBILE CLOTHES HANGER

Gaetano J. Marzilli, Apponaug, R. I.

Application August 29, 1939, Serial No. 292,515

2 Claims. (Cl. 296—37)

The invention relates to an automobile clothes hanger and more especially to a built-in clothes pack, case or the like for motor vehicles of the closed body type.

The primary object of the invention is the provision of a hanger, pack, case, or the like of this character wherein the same is built into the top of the body of a closed passenger type of automobile and is readily and easily accessible for the placing of outer and inner garments, wearing apparel and toilet articles or other paraphernalia required for traveling purposes and their removal in the use of such automobile for touring purposes.

Another object of the invention is the provision of a hanger, pack, case or the like of the character specified, wherein its body involves hingedly connected sections, one being slidably interfitted with the top of the body of the vehicle and the other swingable for releasably interfitting such top, these sections when interfitted with the top being concealed from view and will not detract from the lining interiorly of the body so as to render the interior unsightly and at the same time the said hanger, pack, case or the like will not protrude so as to be in the way of the occupants of such vehicle and is readily accessible for the introduction or the removal of wearing apparel and other paraphernalia required for touring, the wearing apparel and paraphernalia when therein being protected from dirt and dust and in the use avoids the necessity of separate luggage or the like which when in use in the vehicle occupies space within the body thereof as well as lending discomfort to the occupants when touring in the vehicle.

A further object of the invention is the provision of a hanger, pack, case or the like wherein the construction thereof and the built-in arrangement of the same within the body of the motor vehicle of the passenger type are novel and maximum storage space is assured for clothing, paraphernalia, or the like as required when touring in the vehicle and these being readily accessible without inconvenience to the occupants of the vehicle.

A still further object of the invention is the provision of a hanger, pack, case or the like, which is simple in its construction, thoroughly reliable and effective in operation, neat in appearance and inexpensive to manufacture and install.

With these and other objects in view, the invention consists in the features of construction, combination and arrangement of parts as will be hereinafter more fully described in detail, illustrated in the accompanying drawing, which discloses the preferred embodiment of the invention and pointed out in the claims hereunto appended.

In the accompanying drawing:

Figure 1 is a fragmentary side elevation of a motor vehicle of the passenger type being partly broken away and showing the hanger, pack, case or the like, constructed in accordance with the invention installed.

Figure 2 is an enlarged fragmentary vertical sectional view through the body showing the hanger, pack, case or the like, partly broken away.

Figure 3 is a fragmentary horizontal sectional view through the body showing in plan the hanger, pack, case, or the like, the latter being partly broken away.

Figure 4 is a fragmentary vertical transverse sectional view through the body of the vehicle and the hanger, pack, case or the like.

Figure 5 is a fragmentary detail vertical longitudinal sectional view through the hanger, pack, case or the like, showing the fastening of one section thereof interfitted with the top of the vehicle.

Figure 6 is a perspective view of a combined bag and covering for the hanger, pack, case or the like.

Figure 7 is a fragmentary perspective view of one of the guide members for the hanger, pack, case or the like.

Similar reference characters indicate corresponding parts throughout the several views in the drawing.

Referring to the drawing in detail, A designates generally a portion of the closed type of body of a passenger motor vehicle and built interiorly thereof as is customary is a lining 10 which is carried overhead as a ceiling relative to the top 11 of such body and this lining is cut away at a determined area with respect to said top 11 preferably midway of the latter for effecting a space 12 opening downwardly through the ceiling portion for access from within the body of the vehicle and is adapted for accommodating a clothes hanger, pack or case B constituting the present invention and hereinafter fully described.

The hanger, pack or case B includes a sectional tray like unit the sections being indicated at 13 and 14 respectively and at their ends next to each other are connected by a hinge 15 which is concealed in any suitable manner. These sections 13 and 14 at the hinged ends thereof communicate with each other and access is had thereto through an open side at 16, this open side being common to both sections. Secured in any suitable manner to the underside of the top 11 are longitudinally disposed spaced angle pieces 17, these being located within the space 12 forwardly thereof and are provided lengthwise of the same with guide slots 18 which at their rearmost ends terminate in downwardly extended notches 19 and adapted for travel within these slots are guide lugs 20 which project laterally outwardly from hangers 21 fixed to opposite sides 22 of the section 13 so that these sections 13 and 14 when manipulated can be brought properly within the space 12, as shown by full lines by Figures 1 and 2 of the drawing or extracted from this space 12 as shown by dotted lines in said Figure 1. These lugs 20 when engaging the notches 19 suspend the sections 13 and 14 within the body A as shown by dotted lines in Figure 1 of the drawing thereby giving free access to the said sections for the placing of clothes or other wearing apparel therein or the removal of the same therefrom.

The section 13 has built therewith at opposite sides of the same finger released spring tensioned latches in the form of throw bolts 23 which are adapted for engagement in opposite side walls of the recess 12 for the latching of the said section 13 within this space 12 in the position shown by full lines in Figures 1 and 2 of the drawing.

The section 14 at the end thereof remote from the hinged end of the same has built therewith a hand released spring tensioned latch in the form of a throw bolt 24 which is adapted for engaging an end wall next thereto of the space 12 so that the said section 14 will be releasably latched in this space 12 as shown by full lines in Figures 1 and 2 of the drawing.

The section 13 has arranged within suitable supports 25 for the engagement therewith of garment hangers of conventional form so that clothing can be held without undue mussing or wrinkling thereof when stored within the hanger, pack, or case.

Adapted for closing the open side 16 is a removable flexible bag like cover 26 which marginally thereof is provided with the female members 27 of snap fasteners, the male members 28 of which are fixed marginally with respect to the open side 16 throughout both sections 13 and 14 and this cover in its build creates a bag having an entrance at 29 being closed by fasteners 30 so that articles can be stored within this bag cover 26 and such cover when attached to the sections 13 and 14 retain articles therein and also protects such articles from dust and dirt when the hanger, pack or case is confined within the space 12 which constitutes a pocket therefor between the ceiling and roof of the body A of the vehicle. This construction hereinbefore described enables the storing or carriage of wearing apparel or other traveling paraphernalia necessary to persons touring and thereby eliminate the necessity of other grips, luggage or the like being placed within the vehicle body A or otherwise stored therein.

The sections 13 and 14 are readily and easily brought into the space 12 or extracted therefrom and when so brought into the space will be latched against removal, the latches being hand operated for the removal of the said sections from the space and when these sections are pulled outwardly access may be had thereto for the placing of articles therein or the removal of such articles therefrom in a convenient manner.

The sections 13 and 14 when within the space 12 are concealed from view as the closed sides to these sections will be approximately flush with the lining 10 at the ceiling interiorly of the body A of the vehicle and in this manner avoiding any detraction from the neatness or the interior appearance of such body A.

The cover 26 adjacent to the hinged ends of the sections 13 and 14 is fastened somewhat loose at such point so that the section 14 can be swung downwardly without interference when the section 13 is within the space 12 and in this way allowing free access to the section 14 only in that it may not be required to have access to the section 13 confined within the space 12.

The latches 23 and 24 when the sections 13 and 14 are confined within the space 12 are accessible from without the latter so that these sections can be conveniently released from the space 12 for access thereto.

What is claimed is:

1. A garment hanger for a vehicle body having an inset portion created in the ceiling at the interior of said body for effecting a storage space, comprising tray-like sections hingedly connected together, each having opposed open and closed sides, said sections when in their hinged relation to each other being in end to end abutment to one another and in this condition being of a size for accommodation within the inset and having their closed sides substantially flush with the ceiling of the body, elongated longitudinally slotted angle pieces fixed within the inset at the fore portion of the latter and having the slots therein terminating in downwardly extending notches rearwardly located with respect to said inset, guide lugs fixed to opposite sides of the section next to the fore portion of the inset for slidably engaging the slots in said pieces and adapted to engage the notches for the suspension of said sections interiorly of the body when such sections are freed from the inset, and latches carried by both sections and engageable with the body for the locking of the sections in the inset, either together or singly.

2. A garment hanger for a vehicle body having an inset portion created in the ceiling at the interior of said body for effecting a storage space, comprising tray-like sections hingedly connected together, each having opposed open and closed sides, said sections when in their hinged relation to each other being in end to end abutment to one another and in this condition being of a size for accommodation within the inset and having their closed sides substantially flush with the ceiling of the body, elongated longitudinally slotted angle pieces fixed within the inset at the fore portion of the latter and having the slots therein terminating in downwardly extending notches rearwardly located with respect to said inset, guide lugs fixed to opposite sides of the section next to the fore portion of the inset for slidably engaging the slots in said pieces and adapted to engage the notches for the suspension of said sections interiorly of the body when such sections are freed from the inset, latches carried by both sections and engageable with the body for the locking of the sections in the inset, either together or singly, and means for closing the open sides of said sections.

GAETANO J. MARZILLI.